(12) United States Patent
Yanamadala et al.

(10) Patent No.: US 11,043,102 B1
(45) Date of Patent: Jun. 22, 2021

(54) DETECTION OF FREQUENCY MODULATION OF A SECURE TIME BASE

(71) Applicant: Arm Limited, Cambridge (GB)

(72) Inventors: Subbayya Chowdary Yanamadala, Dallas, TX (US); Mikael Yves Marie Rien, Bernin (FR)

(73) Assignee: ARM LIMITED, Cambridge (GB)

( * ) Notice: Subject to any disclaimer, the term of this patent is extended or adjusted under 35 U.S.C. 154(b) by 129 days.

(21) Appl. No.: 16/244,502

(22) Filed: Jan. 10, 2019

(51) Int. Cl.
  *H02H 9/02* (2006.01)
  *G08B 21/18* (2006.01)
  *H02J 7/00* (2006.01)
  *G08B 21/00* (2006.01)

(52) U.S. Cl.
  CPC ............ *G08B 21/18* (2013.01); *G08B 21/00* (2013.01); *H02J 7/00* (2013.01)

(58) Field of Classification Search
  CPC .. H02H 3/18; H02H 9/02; H02H 3/00; H02H 3/28; H01L 21/683; H02B 1/26; G01R 31/02
  See application file for complete search history.

(56) References Cited

U.S. PATENT DOCUMENTS

| | | | | |
|---|---|---|---|---|
| 2006/0187072 | A1* | 8/2006 | Bruce | H01M 10/48 340/636.1 |
| 2008/0049872 | A1* | 2/2008 | Fourtou | H03F 1/56 375/317 |
| 2010/0182156 | A1* | 7/2010 | Bucur | H02J 7/00309 340/636.2 |
| 2012/0194201 | A1* | 8/2012 | Saloio | G01R 27/26 324/537 |
| 2014/0035560 | A1 | 2/2014 | Olmos et al. | |
| 2015/0207333 | A1* | 7/2015 | Baarman | H02J 50/12 307/104 |
| 2015/0280397 | A1* | 10/2015 | Fingerle | H01S 5/0683 372/29.012 |
| 2018/0034365 | A1* | 2/2018 | Sicard | H02M 1/08 |

OTHER PUBLICATIONS

International Search Report and Written Opinion Issued in International Application No. PCT/GB2020/050024, dated Mar. 13, 2020, 15 pages.

\* cited by examiner

*Primary Examiner* — Jared Fureman
*Assistant Examiner* — Esayas G Yeshaw
(74) *Attorney, Agent, or Firm* — Talem IP Law, LLP (57) ABSTRACT

An electronic system can include a charge storage device controllably connected to a voltage source; a protected circuit block controllably connected to the charge storage device for receiving a voltage supply from the charge storage device, the protected circuit block operating via an operating clock signal; a voltage detector coupled to the voltage supply of the protected circuit block; a comparator coupled to an output of the voltage detector; and a countermeasure processor coupled to receive an alert signal from an output of the comparator. The voltage at the voltage supply is related to the frequency of the operating clock and a frequency manipulation attack is detected by monitoring a difference between the voltage supply and a comparison voltage.

20 Claims, 5 Drawing Sheets

DETECTION OF FREQUENCY MODULATION OF A SECURE TIME BASE

BACKGROUND

Tampering, or hacking, of an electronic system can give unauthorized users access to sensitive information. An example of such sensitive information can be secret key information used in cryptography engine implementations, such as AES (Advanced Encryption Standard). An example of tampering can include access to sensitive information by unintended methods (e.g., causing unintended behavior of the system). One of the techniques that unauthorized users, or adversaries, may use to obtain such sensitive information is to exploit the vulnerabilities that exist due to the implementation of the designs in integrated circuits (ICs). For example, a vulnerability may exist that enables an adversary to perform side-channel analysis attacks or fault injection attacks.

There is a need to protect this sensitive data, cryptographic or otherwise, from being accessed by adversaries. Sometimes adversaries may manipulate, or attempt to manipulate, the time bases of an electronic system to determine the functioning of sensitive operations such as AES, a sequence of security protocol, or the reading/writing of control/status bits. The attempt to manipulate the time bases is generally referred to as a clock manipulation attack. In this type of attack, the adversary can manipulate the time base with an objective of causing unintended behavior of a system that can be used to compromise the security of a system.

BRIEF SUMMARY

Detection of frequency manipulation of secure time bases is provided. A monitoring system, and method of using the monitoring system, are described herein that can be employed in an electronic system to monitor a secure time base and determine if tampering of the time base with respect to the frequency of the time base has occurred. The monitored secure time base can include, but is not limited to, an operating clock of a protected circuit block.

The monitoring system described herein can detect a frequency manipulation of an operating clock. The monitoring system can be part of an electronic system. The electronic system can include a charge storage device controllably connected to a voltage source according to a charging clock signal, a protected circuit block controllably connected to the charge storage device according to the charging clock signal, and a monitoring system. The protected circuit block receives a voltage supply from the charge storage device and operates via an operating clock signal. The monitoring system comprises a voltage detector coupled to the voltage supply of the protected circuit block and a comparator coupled to an output of the voltage detector. The monitoring system can determine whether the frequency of the secure time base has been tampered with by determining whether the voltage read from the voltage supply of the protected block satisfies a condition with respect to a threshold amount. For example, the condition may be whether the measured voltage at the voltage supply of the protected circuit block is below a comparison voltage by greater than the threshold amount, where the threshold amount is a preset amount that does not change, a preset amount that can modified at a later time, or a dynamically modified amount based on the context of the operation.

A method of operating an electronic system having frequency manipulation detection can include charging a charge storage device (CSD) for a protected circuit block of the electronic system, the CSD providing a voltage supply to the protected circuit block; operating the protected circuit block via an operating clock signal while the CSD is providing the voltage supply to the protected circuit block; detecting a frequency manipulation of the operating clock signal by: measuring, via a voltage detector, a voltage at the voltage supply to the protected circuit block; and determining whether a difference between the measured voltage and a comparison voltage is greater than a threshold amount; wherein when the difference is greater than the threshold amount, the frequency manipulation of the operating clock signal is detected; and outputting an alert signal to a countermeasure processor when the frequency manipulation of the operating clock signal is detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Detection of frequency modulation of a secure time base is provided. A monitoring system and method of using the monitoring system are described herein that can be employed in an electronic system to monitor a secure time base and determine if tampering of the time base with respect to the frequency modulation of the secure time base has occurred.

The described monitoring system and method of using the same as described herein may be implemented in any electronic system such as an integrated circuit (IC), a system on a chip (SOC), or a board level system that contains at least one secure time base.

Figure 1:
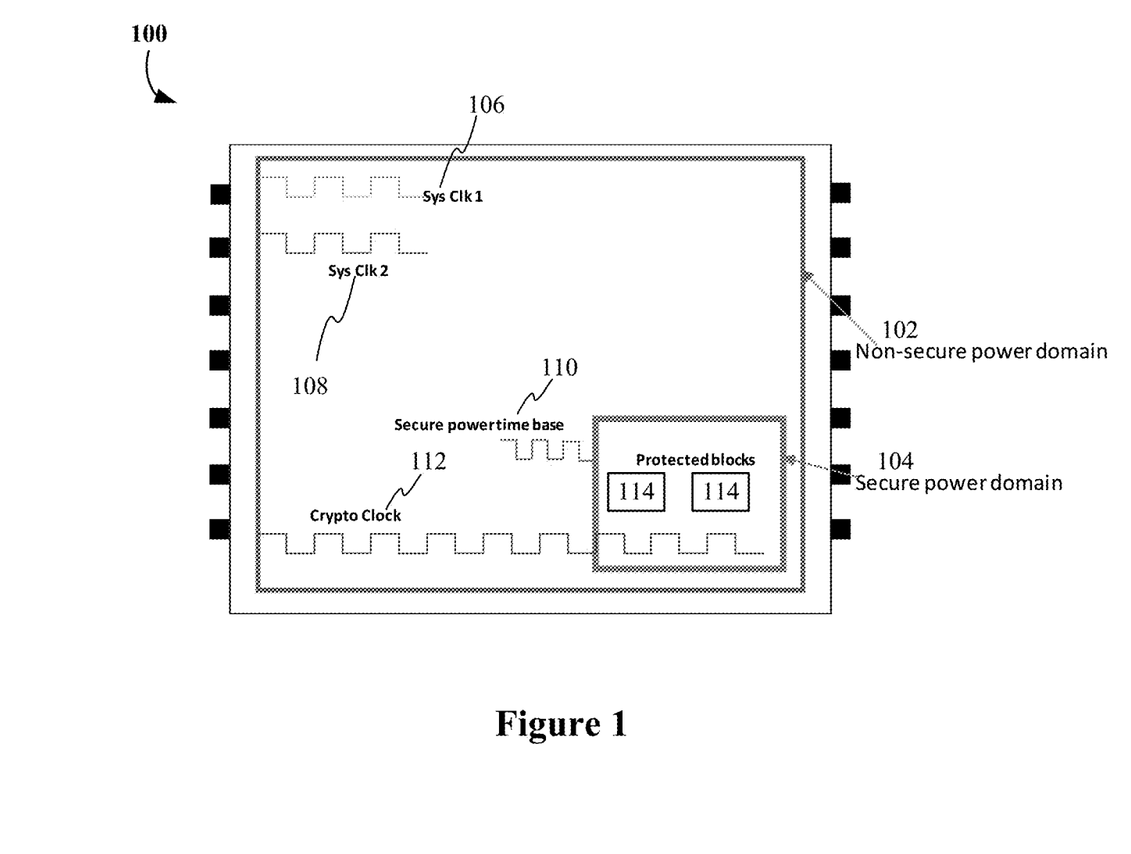
FIG. 1 shows an example electronic system that may incorporate frequency manipulation detection.

FIG. 1 shows an example electronic system that may incorporate frequency manipulation detection. The example electronic system 100 can have a non-secure power domain 102 and a secure power domain 104, where the power domains represent power supply mechanisms to the circuitry within their domains. That is, the electronic system 100 can include multiple time bases that may or may not be related to each other. For example, time bases for the non-secure power domain 102 operations may include, but are not limited to, system clocks such as Sys Clk 1 106 and Sys Clk 2 108. Time bases for secure power domain 104 operations may include, but are not limited to, a secure power time base (SPTB) 110, which may be used to control a charge distribution system for providing an isolated power supply for supplying power to sensitive circuitry (e.g., protected circuit blocks 114), and a Cryptographic (Crypto) Clock 112.

An example of a protected circuit block 114 can be a standard cryptographic cell implementing cryptographic operations such as AES. The secure power domain 104 may be derived from the non-secure power domain 102, independent of non-secure power domain 102, or isolated from the non-secure power domain 102. The protected circuit blocks 114 can be powered as part of the secure power domain 104 either partially or in its entirety for a portion of a time, or an entire time. For example, a secure power domain 104 may include a power supply formed of a protective charge storage device and control switches to control the power to the protected circuit blocks 114. In some cases, a plurality of power supplies (e.g., a plurality of capacitors forming a capacitor system) can be used to supply power for the secure power domain 104. The output of the capacitor system can become the input to the protected circuit blocks 114.

Adversaries may attempt to manipulate the operating clock signal during a clock manipulation attack. For example, an adversary may attempt to manipulate the crypto clock 112 during a clock manipulation attack. By doing so, the adversary can gain insight into the operating characteristics of the protected circuit block and obtain sensitive information.

Figure 2:
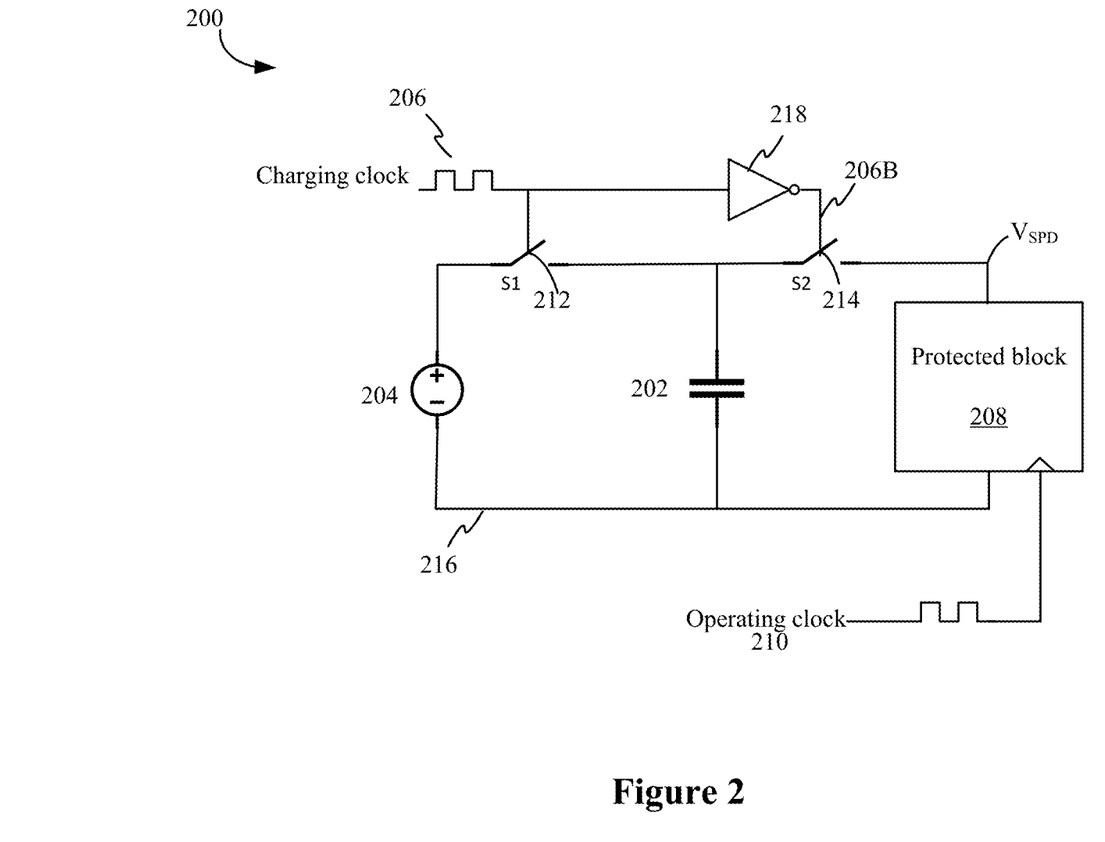
FIG. 2 shows an example implementation of a secure power domain circuit.

FIG. 2 shows an example implementation of a secure power domain circuit.

An electronic system with a secure power domain circuit 200 can include a secure power domain implemented with a charge storage device 202 controllably connected to a voltage source 204 under control of a charging clock signal 206. Although the charge storage device 202 is shown as a capacitor, other devices that are capable of holding a charge could also be used for the charge storage device 202 depending on the implementation. The voltage source 204 may be internal to the electronic system (e.g., internal to the secure power domain circuit 200 or external to the secure power domain circuit), or external to the electronic system. A protected circuit block 208 can be controllably connected to the charge storage device 202 for receiving a voltage supply, $V_{SPD}$, from the charge storage device 202. The protected circuit block 208 operates via an operating clock signal 210. The operating clock may be a secure time base, for example, a cryptography clock such as described with respect to clock 112 of FIG. 1; similarly, charging clock 206 may be a secure power time base such as described with respect to time base 110 of FIG. 1.

The charge storage device 202 is controllably connected to the voltage source 204 by a first switch, S1 212 (and in some cases a switch—not shown—between the charge storage device 202 and a first voltage line 216). The charge storage device charges when S1 212 is closed by the charging clock signal 206. The protected circuit block 208 is controllably connected to the charge storage device 202 by a second switch, S2 214 (and in some cases a switch—not shown—on the first voltage line 216 between the charge storage device 202 and on the charge storage device 202). The protected circuit block 208 receives the voltage supply from the charge storage device 202 when S2 214 is closed by an inverted signal 206B of the charging clock signal 206 (which may be provided, for example, by inverter 218). S1 212 can be controlled by the charging clock signal 206 such that S1 212 opens on an edge (for example, a positive edge or a negative edge) of the charging clock signal 206 and closes on the opposite edge of the charging clock signal 206. S2 214 receives the inverted signal 206B of the charging clock signal such that S2 214 is open when S1 212 is closed, and S2 214 is closed when S1 212 is open. Operation of the protected circuit block 208 can cause the charge on the charge storage device to draw down. In some cases, a switch (not shown) can be provided to discharge the charge storage device 202 either partially or completely between charging operations of the charge storage device 202. For example, such a discharge switch may be provided in parallel with the charge storage device 202.

During design of the electronic system with secure power domain circuit 200, a relationship can be established between the charging clock signal 206 and the operating clock signal 210. That is, the frequency of the two time bases can be designed to have a certain relationship with respect to one another such that the charging clock signal provides sufficient coupling of the charge storage device to the power source in order for the charge storage device to sufficiently power the protected block during operations controlled by the operating clock signal 210. Thus, if the frequency of the operating clock 210 is manipulated, for example by speeding it up, an effect can be felt with respect to the charging clock signal 206 (and more specifically the sufficiency of the power provided by the charge storage device in the secure power domain).

As an illustrative example, the voltage supply value from the charge storage device, $V_{SPD}$, is related to the time the charge storage device 202 has charged and the time the charge storage device 202 is coupled to the protected circuit block 208 when the protected circuit block 208 is in operation. The longer the charge storage device 202 charges before being used by the protected circuit block 208, the greater the value of $V_{SPD}$, until the charge storage device 202 reaches a saturation limit determined by the physical limitations of the device. The length of time the charge storage device 202 charges is dependent on the frequency of the charging clock signal 206. If the charging clock frequency is faster than expected, causing S1 212 to switch too quickly, the charge storage device 202 cannot charge to a sufficient level to supply power to the protected circuit block 208. Thus, there is an expected voltage value that the voltage supply should be able to supply after charging; and this expected voltage value is based on the above described relationship between the charging clock signal 206 and the operating clock signal 210.

In some cases, the relationship between the charging clock signal 206 and the operating clock signal 210 is defined as a preset condition that cannot be modified. This enables an expected voltage value (e.g., reference value) and/or tolerance (e.g., threshold amount to still indicate that the expected voltage value was obtained) to be preset. In some cases, the relationship between the charging clock signal 206 and the operating clock signal 210 is defined as a preset condition but can be modified at a later point. This results in an adjustable preset for the reference value and/or threshold amount. In some cases, the relationship between the charging clock signal 206 and the operating clock signal 210 is determined or automatically modified dynamically based on the context of the circuit operations. This results in a reference value and/or threshold amount that is automatically adjustable based on the operational context.

When the relationship is defined as a preset condition that can or cannot be modified, the relationship can be established by the circuit designer during the design phase, for example, by the designer's choice of capacitance for the charge storage device 202, the operating clock frequency 210, the charging clock frequency 206, the power requirements of the protected circuit block 208 or a combination of these design elements. The corresponding preset values for a reference value may be established, for example, using a voltage divider with a set or programmable resistance (so as to potentially adjust the reference value). As another example, a register may be written to in order to store a value for the reference value and/or the threshold amount.

When the relationship is defined/determined dynamically, a control processor can determine or modify the relationship based on the operational context. Examples of operational context used to automatically determine the relationship may include but are not limited to: mode of operation or functional context; inputs from one or more external or internal sensors such as voltage sensors, temperature sensors, optical sensors, etc.; and time series data such as power variation, command flow or series of operations. The corresponding dynamic values for the reference value and/or threshold amount may be provided by the control processor and stored in a register (or used to adjust a voltage divider or other mechanism used to provide a comparison/reference value).

A clock manipulation attack can be determined by comparing the voltage supply, $V_{SPD}$, to a comparison voltage, such as a reference voltage, $V_{REF}$. When the frequency of the charging clock signal 206 increases above a threshold, the charging period of the charge storage device 202 will not be great enough to support the power needs of the protected circuit block 208. Thus, an illegal speed up can cause a power insufficiency condition at the input to the protected circuit block 208 and detection of the power insufficiency condition can lead to implementing countermeasures to protect the sensitive information in the protected blocks.

Figure 3:
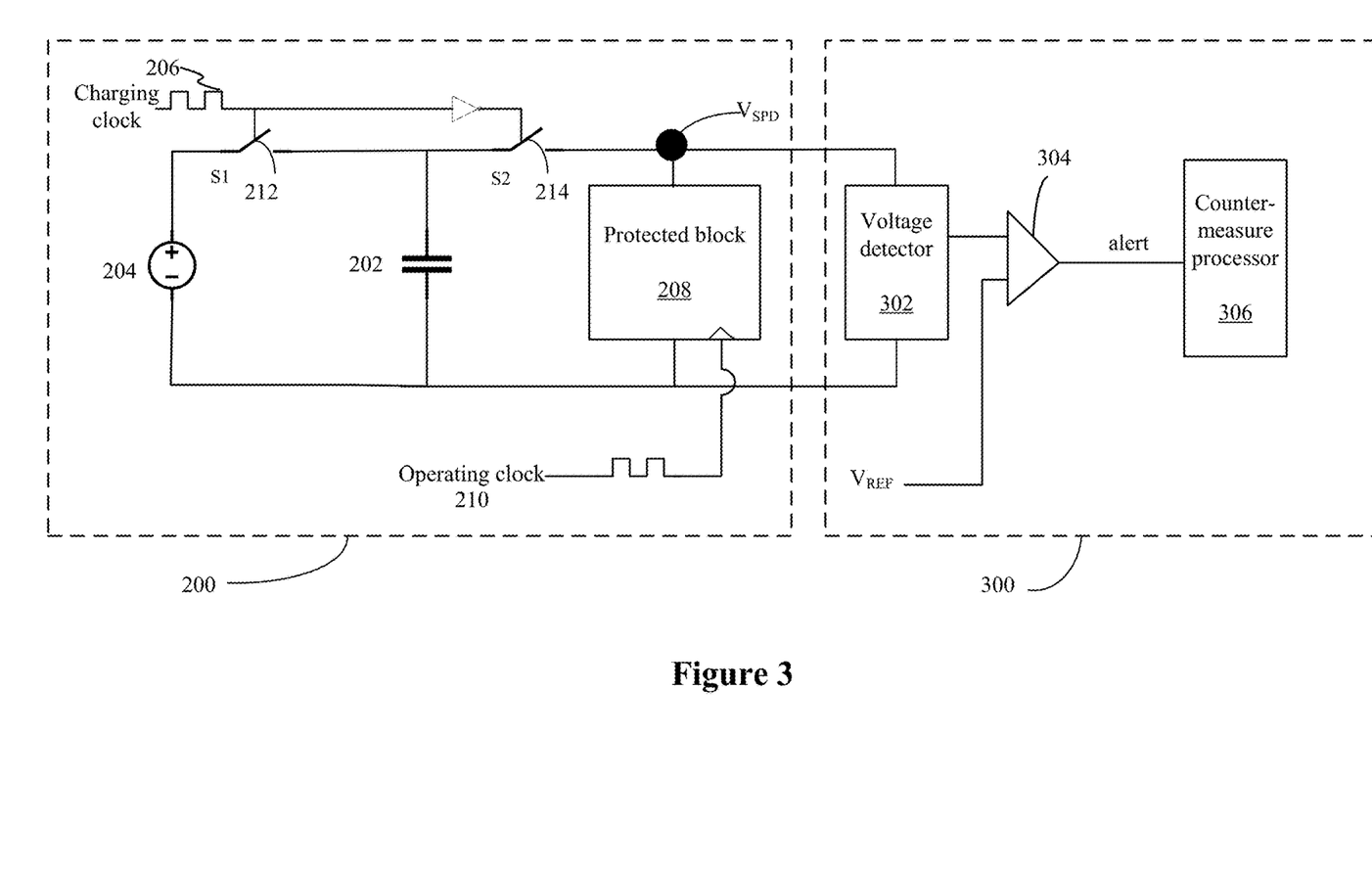
FIG. 3 shows an example implementation of a system for monitoring the voltage supply, $V_{SPD}$, to a protected circuit block of a secure power domain circuit.

FIG. 3 shows an example implementation of a system for monitoring the voltage supply, $V_{SPD}$, to a protected circuit block of a secure power domain circuit. A monitoring system 300 of FIG. 3 can be used to mitigate a potential clock manipulation attack. The monitoring system 300 can be coupled to the secure power domain circuit 200 described with respect to FIG. 2. The monitoring system 300 can measure characteristics of the protected circuit block 208 and compare the measured characteristics to known reference characteristics. An indication of a frequency manipulation attack can be identified from a difference between the measured characteristic and the reference characteristic. One type of characteristic the monitoring system can monitor is the voltage supply, $V_{SPD}$, to the protected circuit block 208.

The monitoring system 300 can include a voltage detector circuit 302 coupled to the voltage supply, $V_{SPD}$, of the protected circuit block 208 and a comparator 304 coupled to the output of the voltage detector 302 to receive $V_{SPD}$ and a comparison voltage, such as a reference voltage $V_{REF}$. In some cases, a counter-measure processor 306 can be coupled to receive an alert signal from the output of the comparator 304. The counter-measure processor 306 may be part of the monitoring system or separate from the monitoring system (such that multiple monitoring systems can be coupled to the counter-measure processor). The counter-measure processor 306 can initiate appropriate countermeasures upon receiving the alert signal. Examples of such countermeasures can include, but are not limited to, shutdown of the operation of the protected circuit block, triggering a response such as a reset condition (e.g., local reset or global reset), and/or a suspension of the operation of the targeted circuits, operations, or functionality. The countermeasures can be either permanent or temporary.

In some cases, one monitoring system 300 can be used for multiple power domain circuits 200; one or more comparators would be used to compare voltage values against a reference voltage or even against other voltage supply values.

A method of detecting frequency manipulation of a secure time base can include measuring the voltage supply of the protected circuit block and comparing the measured voltage supply to a comparison voltage.

Figure 4A:
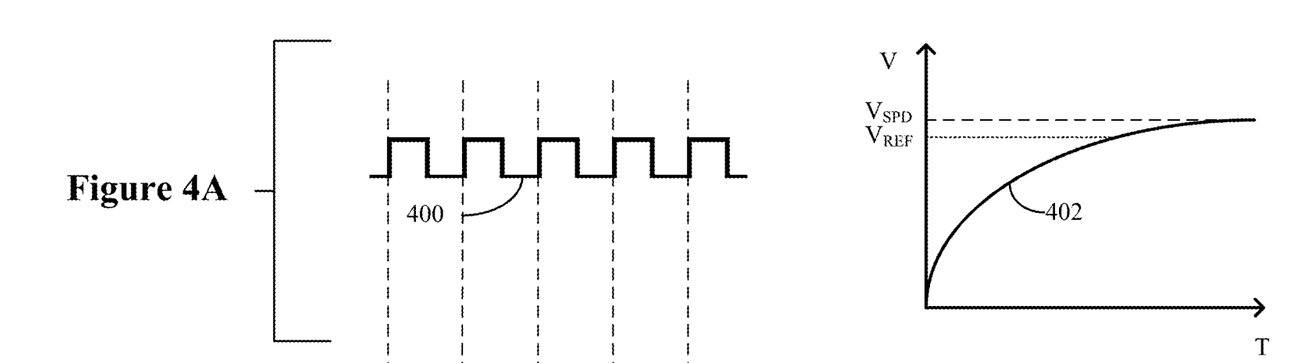
FIGS. 4A and 4B show example waveforms of a secure time base and their effects on the voltage supply value $V_{SPD}$.
Figure 4B:
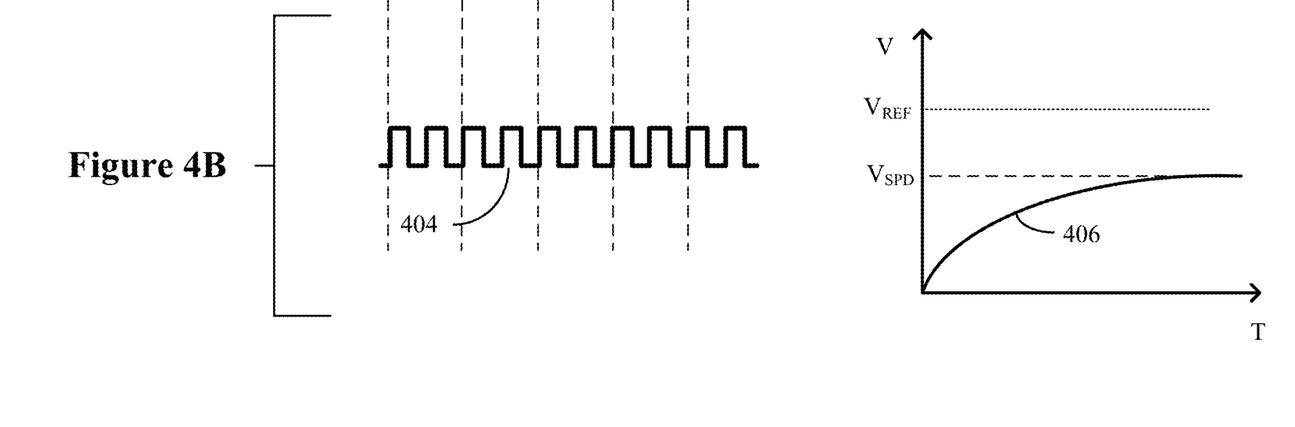

FIG. 4A and FIG. 4B show example waveforms of a secure time base and their effects on the voltage supply value $V_{SPD}$. FIG. 4A shows an example waveform 400 of a secure time base in which tampering has not occurred and the corresponding voltage curve 402 of $V_{SPD}$. In the example of FIG. 4A, the voltage curve of $V_{SPD}$ 402 reaches (and can exceed) the reference value, $V_{REF}$ during the charging cycle (starting on rising edge and ending on falling edge). FIG. 4B shows an example waveform 404 of the secure time base in which tampering has occurred and the corresponding voltage curve 406 of $V_{SPD}$. In the example of FIG. 4B, the voltage curve of $V_{SPD}$ 406 is below the level of the reference value, $V_{REF}$, resulting in an insufficient amount of power to operate the protected circuit block.

Figure 5:
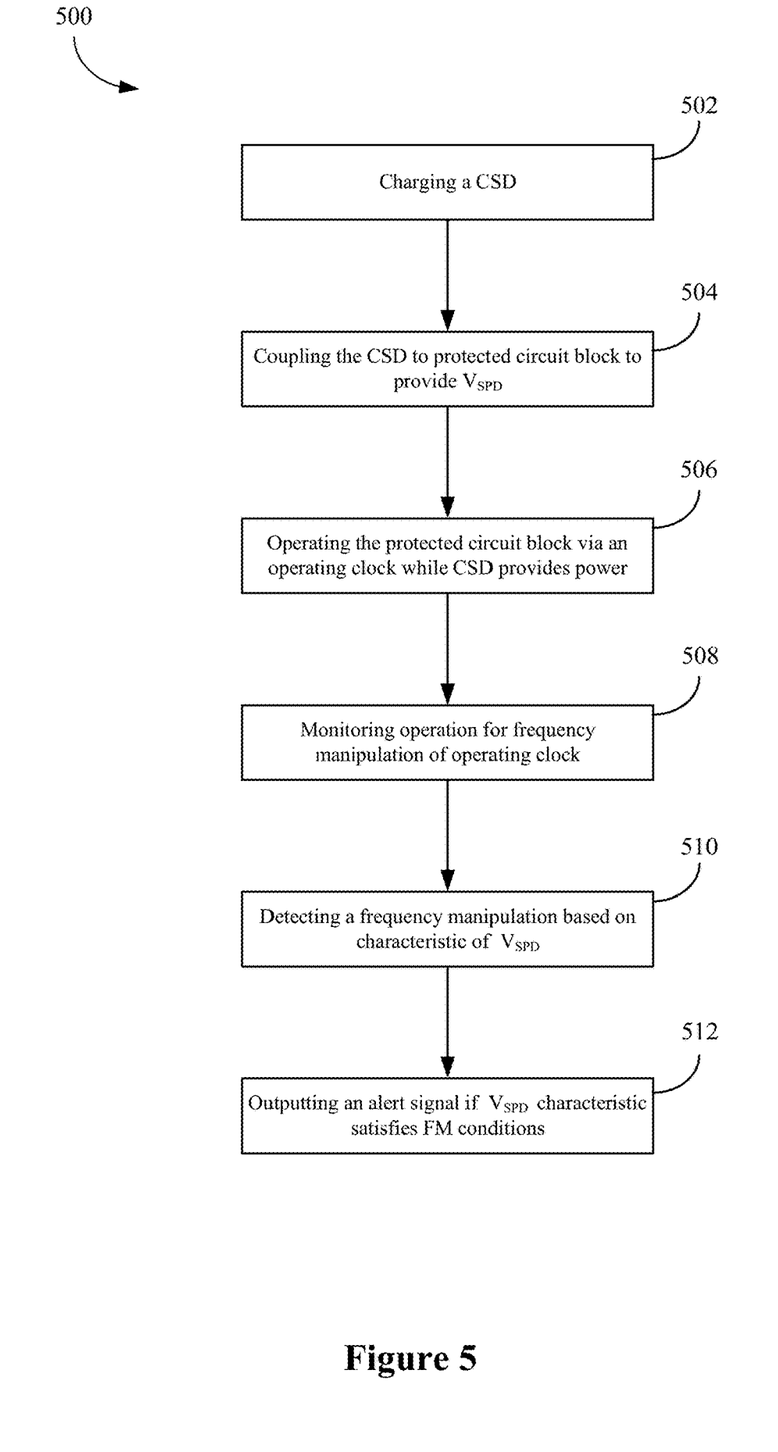
FIG. 5 shows a method of operating an electronic system with frequency manipulation detection.

FIG. 5 shows a method of operating an electronic system with frequency manipulation detection. The process 500 can be performed when operating an electronic system with a monitoring system such as described with respect to FIG. 3. The method 500 can include charging (502) a charge storage device (e.g., CSD 202) and coupling (504) the CSD (e.g., CSD 202) to the protected circuit block (e.g., protected circuit block 208). For example, secure time domain circuit 200 can charge the charge storage device 202 when the circuit 200 receives an edge (either positive or negative edge, as determined by the system designer) of the charging clock signal 206, causing S1 212 to close, coupling the CSD 202 to the voltage source 204 and triggering the CSD 202 to begin charging. The CSD completes charging by the end of the pulse and is coupled instead to the protected circuit block 208. In the example shown in FIG. 3, the switch S2 214 receives the inverted charging clock signal 206B and therefore may close after a slight delay to allow the CSD 202 to provide a voltage supply to the protected circuit block 208 (as provided by operation 504). The CSD 202 can continue providing a voltage supply to the protected circuit block 208 as long as it has charge remaining and switch S2 214 remains closed.

The protected circuit block 208 can begin operating in accordance with an operating clock signal while the CSD 202 provides power (506). Although not shown in process 500, the CSD can be uncoupled from the protected circuit block and recharged (and even discharged) in operations according to the charging clock signal 206 (and inverted signal 206B). Monitoring (508) the operation of the system for frequency manipulation of the operating clock can be carried out during times when the CSD 202 is providing power to the protected circuit block 208 and the protected circuit block is in operation. The monitoring operation can be carried out by reading the voltage value $V_{SPD}$ of the voltage supply to the protected circuit block using a voltage detector circuit 302. The measured voltage supply, $V_{SPD}$, can be compared with a reference value, $V_{REF}$, to determine if the difference between $V_{SPD}$ and $V_{REF}$ is within a threshold amount. Frequency manipulation can then be detected (510) based on a characteristic of $V_{SPD}$, for example, whether the characteristic of $V_{SPD}$ satisfies frequency modification (FM) conditions. The FM conditions may be whether a difference between the measured voltage and a comparison voltage is greater than a threshold amount or whether the measured voltage is below a comparison voltage (e.g., $V_{REF}$ or another circuit's $V_{SPD}$). An alert signal can be output (512) if the $V_{SPD}$ satisfies the frequency modification (FM) conditions. For example, if the difference is greater than the threshold amount, an alert signal can be transmitted to a countermeasure processor to initiate appropriate countermeasures as described above.

Accordingly, the system can detect a frequency manipulation of the operating clock signal by measuring, via a voltage detector, a voltage at the voltage supply to the protected circuit block; and determining whether a difference between the measured voltage and a comparison voltage is greater than a threshold amount. Thus, when the difference is greater than the threshold amount, the frequency manipulation of the operating clock signal is detected.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of operating an electronic system having frequency manipulation detection, the method comprising:
   charging a charge storage device (CSD) for a protected circuit block of the electronic system, the CSD providing a voltage supply to the protected circuit block;
   operating the protected circuit block via an operating clock signal while the CSD is providing the voltage supply to the protected circuit block;
   detecting a frequency manipulation of the operating clock signal by:
   measuring, via a voltage detector, a voltage at the voltage supply to the protected circuit block; and
   determining whether a difference between the measured voltage and a comparison voltage is greater than a threshold amount, wherein the comparison voltage is a measured voltage from another voltage supply to another protected circuit block operated by a corresponding operating clock signal;
   wherein when the difference is greater than the threshold amount, the frequency manipulation of the operating clock signal is detected; and
   outputting an alert signal to a countermeasure processor when the frequency manipulation of the operating clock signal is detected.

2. The method of claim 1, wherein the threshold amount is a preset threshold value.

3. The method of claim 1, wherein the threshold amount is an adjustable preset threshold value, wherein the comparison voltage is an adjustable preset voltage value, or both the threshold amount and the comparison voltage are each adjustable preset values.

4. The method of claim 1, wherein the threshold amount is a dynamic threshold value that automatically adjusts based on an operational context, the comparison voltage is a dynamic voltage value that automatically adjusts based on the operational context, or both the threshold amount and the comparison voltage are each dynamic values that automatically adjust based on the operational context.

5. The method of claim 4, wherein the operational context is a mode of operation.

6. The method of claim 4, wherein the operational context is inputs from one or more external or internal sensors.

7. The method of claim 4, wherein the operational context is a time series data from a group consisting of power variation, command flow, and series of operations.

8. The method of claim 1, further comprising issuing a temporary or permanent response upon the countermeasure processor receiving the alert signal.

9. The method of claim 8, wherein the response comprises shutting down operation of the protected circuit block.

10. The method of claim 8, wherein the response comprises triggering a reset condition.

11. The method of claim 8, wherein the response comprises suspending operations or functionality of the protected circuit block.

12. An electronic system, comprising:
    a charge storage device controllably connected to a voltage source;
    a protected circuit block controllably connected to the charge storage device for receiving a voltage supply from the charge storage device, and wherein the protected circuit block operates via an operating clock signal;
    a first switch controllably connecting the charge storage device to the voltage source according to a charging clock signal;
    a second switch controllably connecting the protected circuit block to the charge storage device according to an inverted signal of the charging clock signal;
    a voltage detector coupled to the voltage supply of the protected circuit block;
    a comparator coupled to an output of the voltage detector; and
    a countermeasure processor coupled to receive an alert signal from an output of the comparator.

13. The electronic system of claim 12, wherein the comparator receives a comparison voltage for comparing with a measured voltage at the output of the voltage detector.

14. The electronic system of claim 13, wherein the comparator outputs the alert signal when a difference between the measured voltage and the comparison voltage is greater than a threshold amount.

15. The electronic system of claim 14, wherein the comparison voltage is a reference voltage.

16. The electronic system of claim 12, wherein the countermeasure processor issues a temporary or permanent response upon receiving the alert signal, wherein the response comprises at least one of: shutting down operation of the protected circuit block, triggering a reset condition, or suspending operations or functionality of the protected circuit block.

17. The electronic system of claim 13, wherein the comparison voltage is a measured voltage from another voltage supply to another protected circuit block operated by a corresponding operating clock signal.

18. An electronic system, comprising:
    a charge storage device controllably connected to a voltage source;
    a protected circuit block controllably connected to the charge storage device for receiving a voltage supply from the charge storage device, and wherein the protected circuit block operates via an operating clock signal;
    a voltage detector coupled to the voltage supply of the protected circuit block;
    a comparator coupled to an output of the voltage detector; and
    a countermeasure processor coupled to receive an alert signal from an output of the comparator, wherein the comparator receives a comparison voltage for comparing with a measured voltage at the output of the voltage detector, wherein the comparison voltage is a measured voltage from another voltage supply to another protected circuit block operated by a corresponding operating clock signal.

19. The electronic system of claim 18, wherein the countermeasure processor issues a temporary or permanent response upon receiving the alert signal, wherein the response comprises at least one of: shutting down operation of the protected circuit block, triggering a reset condition, or suspending operations or functionality of the protected circuit block.

20. The electronic system of claim 18, wherein the comparator outputs the alert signal when a difference between the measured voltage and the comparison voltage is greater than a threshold amount.

* * * * *